United States Patent
Kishibata

(10) Patent No.: US 6,647,768 B2
(45) Date of Patent: Nov. 18, 2003

(54) INTAKE NEGATIVE PRESSURE DETECTION APPARATUS FOR MULTI-CYLINDER INTERNAL COMBUSTION ENGINE

(75) Inventor: Kazuyoshi Kishibata, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 59 days.

(21) Appl. No.: 10/008,343

(22) Filed: Nov. 13, 2001

(65) Prior Publication Data

US 2002/0059823 A1 May 23, 2002

(30) Foreign Application Priority Data

Nov. 22, 2000 (JP) ........................................ 2000-355839

(51) Int. Cl.[7] .............................................. G01M 15/00
(52) U.S. Cl. ...................................................... 73/118.2
(58) Field of Search ............................ 73/118.2, 117.2, 73/117.3, 116; 123/52.1, 54.4, 58.7, 190.08, 190.11, 190.15, 188.13

(56) References Cited

U.S. PATENT DOCUMENTS

| | | | | |
|---|---|---|---|---|
| 4,080,947 A | | 3/1978 | Iizuka | 123/198 F |
| 4,499,881 A | | 2/1985 | Takao | 123/492 |
| 4,532,905 A | * | 8/1985 | Yokooku et al. | 123/443 |
| 4,644,784 A | * | 2/1987 | Okano et al. | 73/117.3 |
| 4,744,244 A | * | 5/1988 | Tanaka | 73/115 |
| 5,542,389 A | * | 8/1996 | Miyamoto et al. | 123/339.1 |
| 5,685,285 A | | 11/1997 | Ohtani et al. | 123/698 |

* cited by examiner

Primary Examiner—Eric S. McCall
(74) Attorney, Agent, or Firm—Pearne & Gordon LLP

(57) ABSTRACT

An intake negative pressure detection apparatus for detecting an intake negative pressure of all cylinders of a multi-cylinder internal combustion engine by using negative pressure sensors, the number of which is fewer than the number of cylinders and each of the negative pressure sensors provided commonly for two cylinders of the internal combustion engine and connected to intake passages of the two cylinders, respectively through a change-over valve, which is so constructed as to introduce a pressure within the intake passage having a higher absolute value of the inner negative pressure among the intake passages into the negative pressure sensor.

6 Claims, 6 Drawing Sheets

Fig. 6A
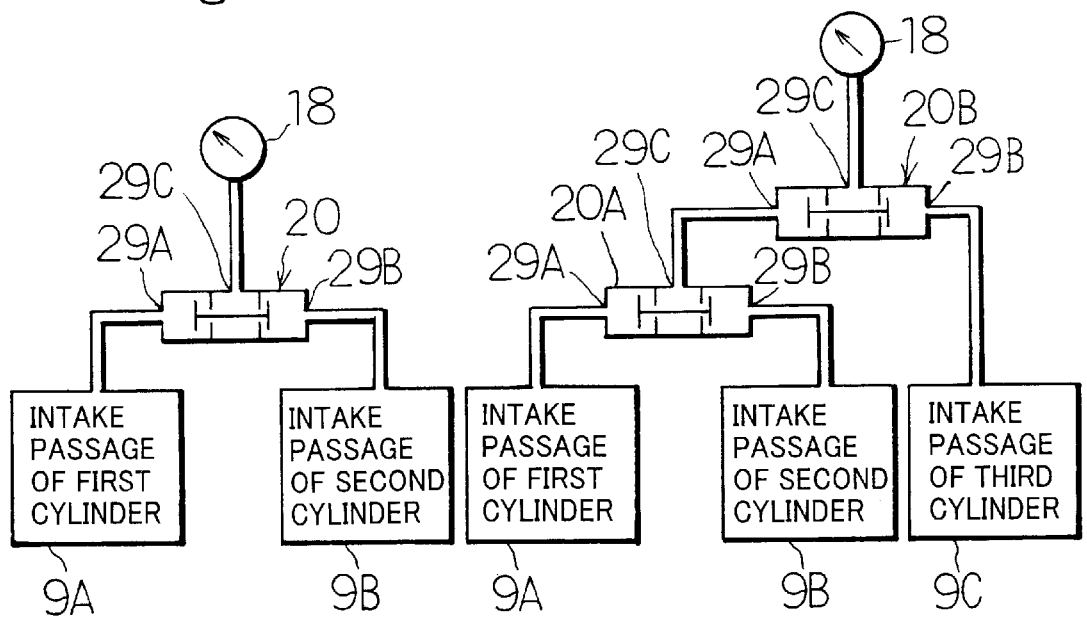
Fig. 6B
Fig. 6C
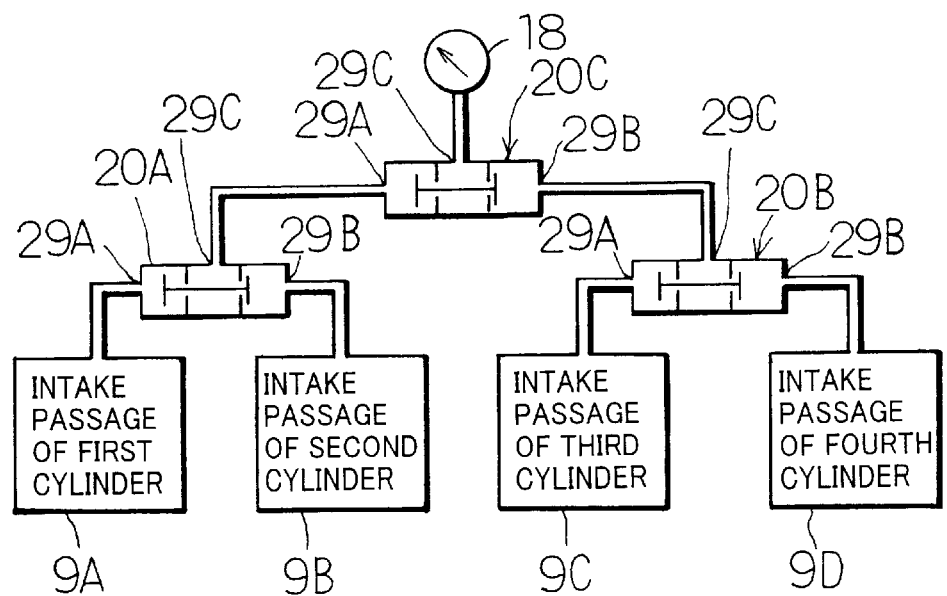

INTAKE NEGATIVE PRESSURE DETECTION APPARATUS FOR MULTI-CYLINDER INTERNAL COMBUSTION ENGINE

TECHNICAL FIELD OF THE INVENTION

This invention relates to an intake negative pressure detection apparatus for a multi-cylinder internal combustion engine to detect an intake negative pressure of the multi-cylinder internal combustion engine, and also to a change-over valve suitable for detection of the intake negative pressure.

BACKGROUND OF THE INVENTION

In an electronic control fuel injection type internal combustion engine (EFI type internal combustion engine), when the amount of fuel injected from an injector provided for each of the cylinders is determined, it is required to know an amount of air flowing in each of the cylinders in an intake step. Since it is difficult to directly know the amount of air flowing in each of the cylinders, there has been performed a method in which a negative pressure sensor for each of the cylinders is provided to detect a negative pressure in the intake passage provided for each of the cylinders (referred to as "intake negative pressure" later) and the amount of air flowing in the each of the cylinders is presumed from the detected negative pressure and a volume efficiency of each of the cylinders.

As aforementioned, since the intake negative pressure in each cylinder can be positively detected by providing the negative pressure sensor for each cylinder, the amount of air flowing in each cylinder can be properly presumed. However, as the negative pressure sensor is provided for each cylinder as aforementioned, the expensive negative pressure sensors, the number of which corresponds to the number of the cylinders are required, which causes the cost of the engine to be unavoidably higher.

It will be considered that one negative pressure sensor is commonly provided for two cylinders and connected to the intake pipes of the two cylinders through a fine pipe.

However, since the negative pressure sensor commonly provided and connected to the intake pipes of the two cylinders will measure the average intake negative pressure of the two cylinders, neither variation in air flux between the two cylinders nor the maximum value of the intake negative pressure of each cylinder can be properly measured.

It will be further considered that a negative pressure sensor is connected only to the intake passage of one cylinder among the cylinders so as to detect only the negative pressure in the intake passage of the one cylinder and that the amount of air flowing in the cylinders is presumed in the assumption that the negative pressure in the intake passages of the other cylinders is the same as the detected negative pressure. However, there happens a problem that this method cannot measure variation in the amount of air between the cylinders.

In an internal combustion engine controlled by an electronic control unit (ECU) in various manners, acceleration state and variation in load have been judged from variation in the negative pressure in the intake passages. In the case that only the negative pressure in the intake passage of the selected one of the cylinders is measured, as the acceleration state and the load state vary immediately after the selected cylinder performs the intake step, the variation cannot be detected until the intake step of the next combustion cycle is performed. Thus, the detection of variation in the state of the engine is delayed and this disadvantageously prevents the engine from being properly controlled.

SUMMARY OF THE INVENTION

Accordingly, it is an object of the invention to provide an intake negative pressure detection apparatus for a multi-cylinder internal combustion engine adapted to be able to individually detect an intake negative pressure of each of the cylinders using negative pressure sensors, the number of which is fewer than the number of the cylinders.

The invention provides an intake negative pressure detection apparatus for detecting a negative pressure in an intake passage provided for each of the cylinders of a multi-cylinder internal combustion engine, which is adapted to be able to individually detect the negative pressure in the intake passage of the cylinders using one negative pressure sensor.

To this end, in the invention, a common negative pressure sensor is provided for the cylinders of the internal combustion engine and connected through change-over means to intake passages provided for the cylinders, respectively. The change-over means is constructed to introduce into the negative pressure sensor the intake passage pressure having the highest absolute value among the inner negative pressures of the intake passages connected to the change-over means.

In general, the multi-cylinder internal combustion engine never performs the intake step for the cylinders simultaneously and when each cylinder is in the intake step, the absolute value of the negative pressure in the intake passage of the corresponding cylinder is higher than that of the negative pressure in the intake passages of the other cylinders. Thus, with the intake negative pressure detection apparatus constructed as aforementioned, the intake negative pressures of the cylinders can be individually detected. Therefore, according to the invention, the negative pressure in the intake passage of each of the cylinders can be accurately detected without any increase in the cost.

In the invention, a common negative pressure sensor is provided for all the cylinders of the internal combustion engine and connected through change-over means to the intake passages of all the cylinders.

In this case, the change-over means is so constructed as to introduce into the negative pressure sensor the intake passage pressure having the highest absolute value of the inner negative pressure among the pressures of the intake passages connected to the change-over means.

Thus, it will be noted that the change-over means serves to selectively transfer the pressures in the intake passages provided for the cylinders of the multi-cylinder internal combustion engine, respectively, into the negative pressure sensor commonly provided for the cylinders. The change-over means may be formed of a change-over valve constructed as described herein later.

The change-over valve for the change-over means may comprise a valve housing having an intermediate chamber provided inside, first and second pressure detection chambers disposed on both sides of and adjacent to the intermediate chamber, first and second penetration holes provided in a first partition between the first pressure detection chamber and the intermediate chamber and a second partition between the second pressure detection chamber and the intermediate chamber, respectively, a slide member extending through the intermediate chamber and the first and second penetration holes and supported on the first and second partitions in such a manner as it is able to slide along the axial direction thereof, first and second vent holes provided in the first and second partitions so as to communicate the intermediate chamber with the first pressure detection chamber and the intermediate chamber with the second pressure detection chamber, respectively, first and second valve bodies provided on one end of the slide member positioned in the first pressure detection chamber and on the other end of the slide member positioned in the second pressure detection chamber and serving to close the first and second vent holes when the slide member is displaced for predetermined distance on the direction toward the first and second pressure detection chamber, first and second ports provided in the valve housing so as to communicate the first and second pressure detection chambers with outside and a third port provided in the valve so as to communicate the intermediate chamber with outside and the slide member is displaced toward the pressure detection chamber having the lower inner pressure when the first and second pressure detection chambers have the different inner pressures whereby the pressure detection chamber having the lower inner pressure is communicated with the intermediate chamber.

The first and second pressure detection chambers are connected through the first and second ports to pipes through which the pressures in the intake passages of the different cylinders of the internal combustion engine are transmitted while the intermediate chamber is connected through the third port to the negative pressure sensor.

With the change-over valve constructed as aforementioned, the negative pressure detection apparatus for the two cylinder internal combustion engine can be constituted only by the single change-over valve and the single negative pressure sensor while the negative pressure detection apparatus for three or more cylinder internal combustion engine can be constituted by the two or more change-over valves and the single negative pressure sensor to which the intake passages of the three or more cylinders are connected through the change-over valves in tournament form.

More particularly, in case that the negative pressures in the first and second intake passages for the first and second cylinders of the two cylinder internal combustion engine should be detected, the first and second ports of the single change-over valve are connected to the first and second intake passages, respectively and the single negative pressure sensor is connected to the third port of the change-over valve whereby the negative pressures in the intake passages for the two cylinders can be detected. Thus, it will be noted that the change-over means is constituted only by the single change-over valve.

In case that the negative pressures in the first through third intake passages for the first through third cylinders of the three cylinder internal combustion engine should be detected, the first and second ports of the first change-over valve are connected to the first and second intake passages, respectively, the first port of the second change-over valve is connected to the third port of the first change-over valve, the second port of the second change-over valve is connected to the third intake passage of the internal combustion engine and the third port of the second change-over valve is connected to the negative pressure sensor whereby the negative pressures in the intake passages for the three cylinders can be individually detected by the single negative pressure sensor.

Thus, it will be noted that the change-over means for the three cylinder internal combustion engine is constituted by the first change-over valve having the first and second ports connected to the first and second intake passages, respectively, and the second change-over valve having the first port connected to the third port of the first change-over valve, the second port connected to the third intake passage and the third port connected to the negative pressure sensor.

In case that the negative pressures in the first through fourth intake passages for the first through fourth cylinders of the four cylinder internal combustion engine should be detected, the first and second ports of the first change-over valve are connected to the first and second intake passages, respectively, the first and second ports of the second change-over valve are connected to the third and fourth intake passages, the first and second ports of the third change-over valve are connected to the third ports of the first and second change-over valves, respectively and the third port of the third change-over valve is connected to the negative pressure sensor whereby the negative pressures in the intake passages for the four cylinders can be individually detected by the single negative pressure sensor.

Thus, it will be noted that the change-over means for the four cylinder internal combustion engine is constituted by the first change-over valve having the first and second ports connected to the first and second intake passages, respectively, the second change-over valve having the first and second ports connected to the third and fourth intake passages, respectively, and the third change-over valve having the first and second ports connected to the third ports of the first and second change-over valves and the third port connected to the negative pressure sensor.

Otherwise, the intake negative pressures of the multi-cylinder internal combustion engine having a number of cylinders may be detected by more than one negative pressure sensors. For instance, in the four cylinder internal combustion engine, the intake passages of the two cylinders are connected through the change-over means to one of the two negative pressure sensors while the intake passages of the other two cylinders are connected through the change-over means to the other of the two negative pressure sensors whereby the respective negative pressure sensors can detect the intake negative pressures of the two cylinders. In this case, since the number of the negative pressure sensors can be reduced in comparison with the prior art in which the negative pressure sensor is provided for each of the cylinders, the cost for detecting the intake negative pressure can be reduced.

Similarly, the intake negative pressure of the multi-cylinder internal combustion engine which has six cylinders or more may be positively detected by using the negative pressure sensors, the number of which is fewer than the number of the cylinders.

In general, in case that the intake negative pressure of the multi-cylinder internal combustion engine having $2n$ cylinders (n is an integer of two or more) should be detected, the $2n$ cylinders are divided into a plural of sets of two cylinders, in which of the same set the intake step is not performed simultaneously, one change-over valve is provided for each set of two cylinders, the first and second ports of the change-over valve for each set of two cylinders are connected to one and the other of the two intake passages for the respective cylinders, respectively and then third port of the change-over valve is connected to the negative pressure sensor provided commonly for each set of two cylinders whereby the negative pressures in the intake passages of the $2n$ cylinders can be detected by the negative pressure sensors, the number of which is one half of the number of the cylinders.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 6A through 6C show the intake negative pressure sensor according to various forms of the invention;

DETAILED DESCRIPTION OF PREFERRED EMBODIMENTS

An intake negative pressure detection apparatus of the invention will be described with reference to the drawings just below.

Figure 1:
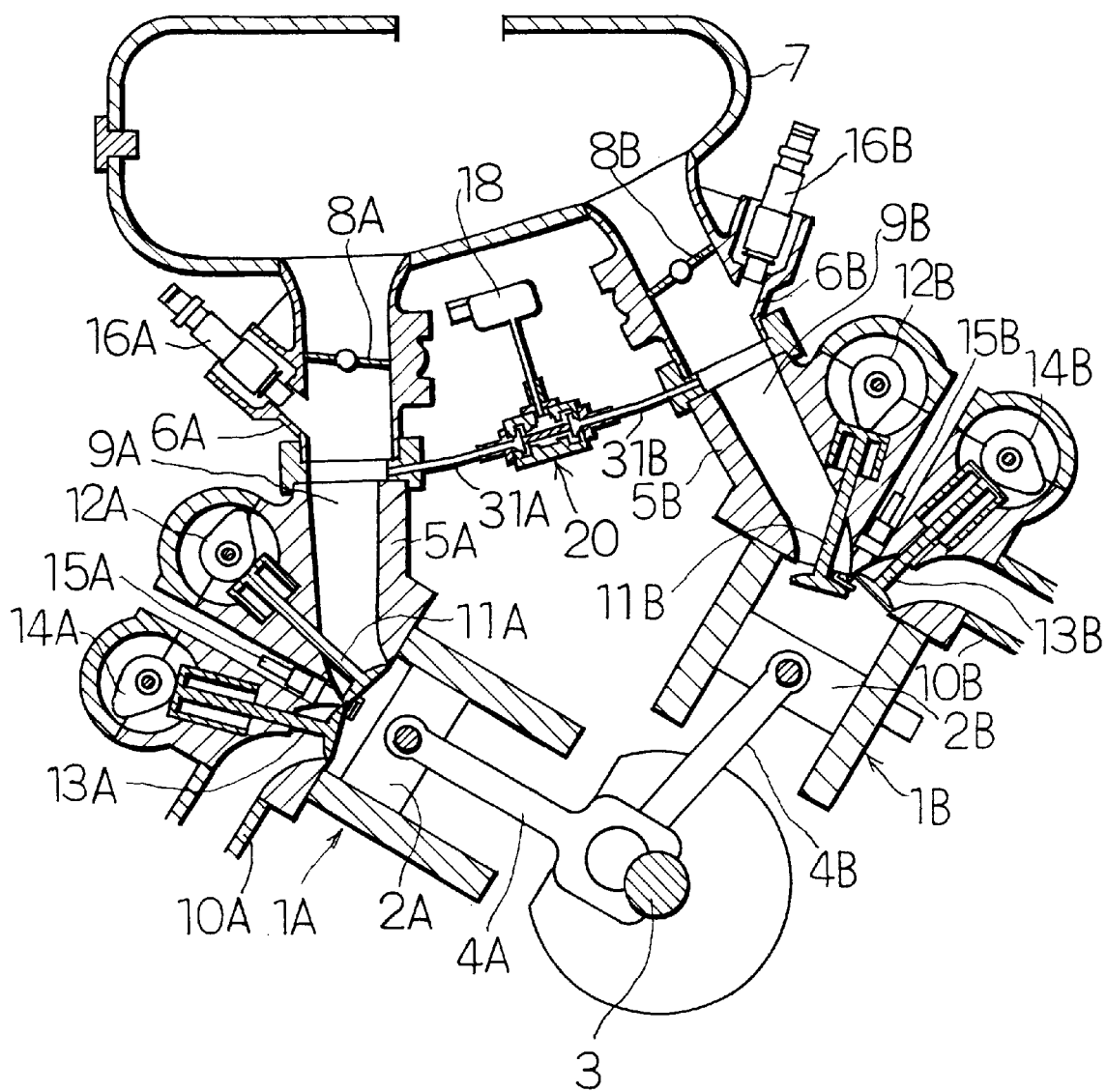
FIG. 1 is a cross sectional view of a two cycle internal combustion engine having an intake negative pressure detection apparatus constructed in accordance with one embodiment of the invention.

In FIG. 1 is shown a V-type two cylinder internal combustion engine as an example of a multi-cylinder internal combustion engine. The two cycle internal combustion engine comprises first and second cylinders 1A and 1B having pistons 2A and 2B provided therein, respectively, which are connected through connecting rods 4A and 4B to a crankshaft 3.

First and second intake manifolds 5A and 5B at one end are connected to intake ports of the first and second cylinders 1A and 1B, respectively and at another end are connected to first and second throttle bodies 6A and 6B at one end. An air cleaner 7 is connected to the other ends of the first and second throttle bodies 6A and 6B. First and second throttle valves 8A and 8B are provided in the first and second throttle bodies 6A and 6B, respectively. First and second intake passages 9A and 9B which serve to introduce air into the first and second cylinders 1A and 1B, respectively, are formed by the intake manifolds 5A and 5B and the throttle bodies 6A and 6B, respectively.

First and second exhaust pipes 10A and 10B are connected to exhaust ports of the first and second cylinders, first and second intake valves 11A and 11B which are driven by cams 12A and 12B serve to open and close the intake ports of the first and second cylinders 1A and 1B, first and second exhaust valves 13A and 13B which are driven by cams 14A and 14B, respectively serve to open and close the exhaust ports of the first and second cylinders 1A and 1B, respectively. Ignition plugs 15A and 15B are provided in the first and second cylinders 1A and 1B, respectively.

In the illustrated embodiment, first and second injectors 16A and 16B in the form of an electromagnetic type fuel injection valve are provided in the first and second throttle bodies 6A and 6B, respectively. Fuel is supplied from a fuel pump not shown to the first and second injectors 16A and 16B and injected from the injectors 16A and 16B into the throttle bodies 6A and 6B, respectively.

A negative pressure sensor 18 is commonly provided for the first and second cylinders to detect the negative pressures in the intake passages 9A and 9B. The negative pressure sensor 18 is connected through a change-over valve 20 and connection pipes 31A and 31B to the first and second intake passages 9A and 9B, respectively.

Figure 2:
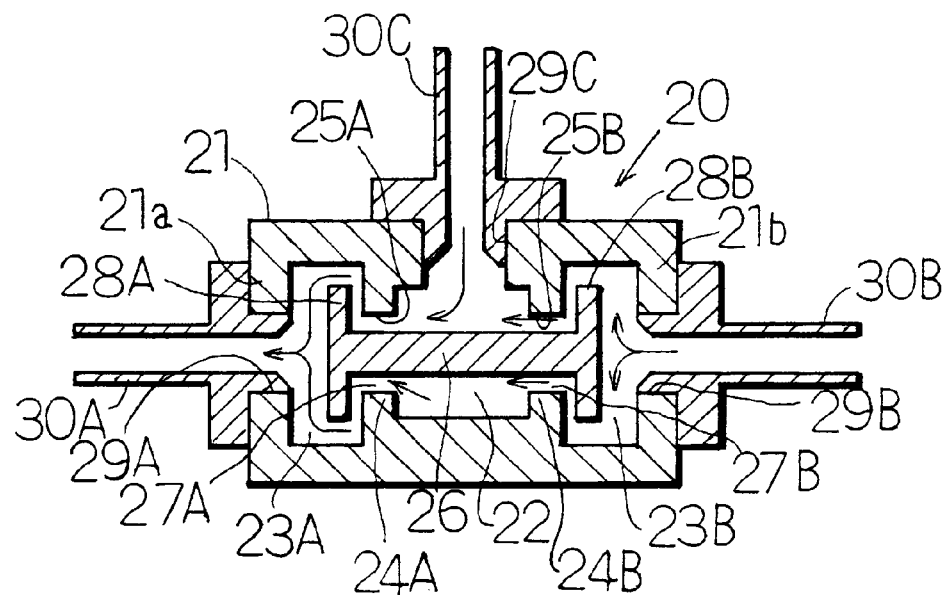
FIG. 2 is a cross sectional end view of a change-over valve according to one example used in the invention.

As shown in FIG. 2, the change-over valve 20 comprises a valve housing 21 having a cross section of circle or square and a cylindrical form and both ends in the axial direction closed by end walls 21a and 21b. The valve housing 21 has an intermediate chamber 22 provided in the center within the valve housing 21 and first and second pressure detection chambers 23A and 23B positioned on both side of the intermediate chamber 22. First and second penetration holes 25A and 25B are provided in a first partition 24A between the first pressure detection chamber 23A and the intermediate chamber 22 and in a second partition 24B between the second pressure detection chamber 23B and the intermediate chamber 22, respectively.

Within the valve housing 21, it is contained a rod-like slide member 26 which extends through the intermediate chamber 22 and also first and second penetration holes 25A and 25B and is supported in the first and second partitions 24A and 24B in such a manner as the slide member 26 is able to slide along the axial direction thereof. First and second vent holes 27A and 27B are formed around the slide member 26 so as to communicate the intermediate chamber 22 with the first and second pressure detection chambers 23A and 23B, respectively.

First and second valve bodies 28A and 28B of disk-like form are provided on one end of the slide member 26 positioned in the first pressure detection chamber 23A and on the other end of the slide member 26 positioned in the second pressure detection chamber 23B and serve to close the first or second vent holes 27A or 27B while engaging first and second valve bodies 28A and 28B with the portion around the first and second vent holes 27A or 27B when the slide member 26 is displaced for predetermined distance on the direction toward the first or second pressure detection chamber 23A or 23B.

In the end wall 21a at one end of the valve housing 21 is formed a first port 29A which communicates the first pressure detection chamber 23A with outside while in the end wall 21b another end of the valve housing 21 is formed a second port 29B which communicates the second pressure detection chamber 23B with outside. In the side wall of the valve housing 21 is formed a third port 29C which communicates the intermediate chamber 22 with outside. First through third pipe couplings 30A though 30C are provided in the first through third ports 29A through 29C, respectively.

Since the illustrated change-over valve 20 has the first and second vent holes 27A and 27B to communicate the intermediate chamber 22 with the first and second pressure detection chambers 23A and 23B, respectively, the vent holes 27A and 27B should be carefully formed without any trouble in support of the slide member 26. The vent holes 27A and 27B may be formed as shown in FIGS. 4A through 4D. The first and second vent holes 27A and 27B may be formed in the same manner and FIGS. 4A through 4D show how the first vent hole 27A is formed.

Figure 4A:
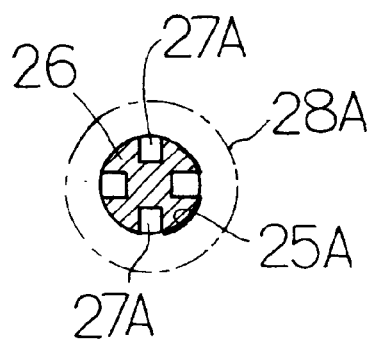
FIGS. 4A through 4D illustrate the different forms of the vent holes provided in the change-over valve shown in FIG. 2, respectively.

In the embodiment of FIG. 4A, the penetration hole 25A extending through the partition 24A between the intermediate chamber 22 and the first pressure detection chamber 23A is formed of circle while the slide member 26 extending through the penetration hole 25A has the circular cross section and the vent hole 27A is formed of longitudinal grooves or splines provided in the outer surface of the slide member 26.

Figure 4B:
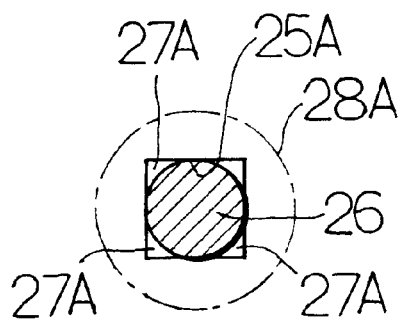

In the embodiment of FIG. 4B, the penetration hole 25A is formed of square while the slide member 26 extending through the penetration hole 25A has the circular cross section and the vent hole 27A is formed of spaces between the outer surface of the slide member 26 and the inner face of the penetration hole 25A.

Figure 4C:
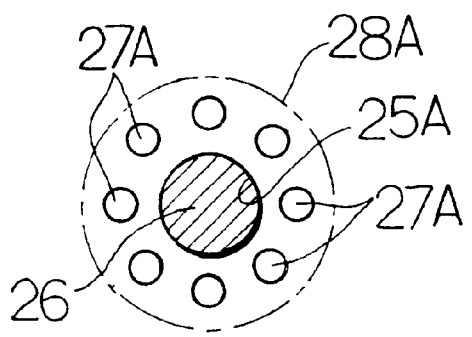

In the embodiment of FIG. 4C, the penetration hole 25A is formed of circle while the slide member 26 extending through the penetration hole 25A has the circular cross section and the vent hole 27A comprises fine holes formed in the partition 24A around the penetration hole 25A.

Figure 4D:
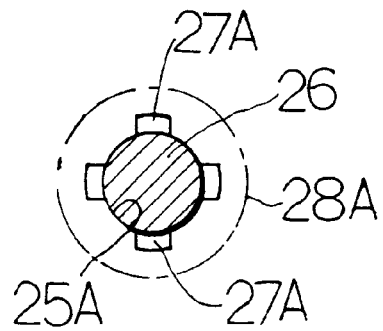

In the embodiment of FIG. 4D, the penetration hole 25A is formed of circle while the slide member 26 extending through the penetration hole 25A has the circular cross section and the vent hole 27A comprises grooves formed in the partition 24A around the penetration hole 25A and opening in the penetration hole 25A.

In FIGS. 4A through 4D, the outline of the valve body 28A is indicated by a chain line.

The illustrated change-over valve 20 displaces the slide member 26 on the side of the pressure detection chamber having the lower inner pressure among the pressure detection chambers 23A and 23B when the inner pressures of them are different from each other so that the pressure detection chamber having the lower inner pressure is communicated with the intermediate chamber 22.

The first and second pressure detection chambers 23A and 23B are connected through the first and second ports 29A and 29B to pipes through which the pressure in the intake passages of the different cylinders of the internal combustion engine is transmitted while the intermediate chamber 22 is connected through the third port 29C to the negative pressure sensor 18.

In the illustrated embodiment, to the first and second pipe couplings 30A and 30B provided in the first and second ports 29A and 29B, respectively, first and second fine connection pipes 31A and 31b are connected at one end, the other ends of which are connected to the first and second throttle bodies 6A and 6B, respectively, so as to be communicated with the intake passages 9A and 9B, respectively.

To the third pipe coupling 30C provided in the third port 29C, one end of a third fine connection pipe 31C is connected, the other end of which is connected to the negative pressure sensor 18.

In the illustrated embodiment, the change-over means to selectively connect the negative pressure sensor 18 to the intake passage having the larger negative pressure among the intake passages 9A and 9B and the intake negative pressure detection apparatus is constituted by the change-over means and the negative pressure sensor 18.

In the illustrated intake negative pressure detection apparatus, the pressure in the first and second intake passages 9A and 9B are transmitted through the connection pipes 31A and 31B to the first and second pressure detection chambers 23A and 23B, respectively.

Figure 3:
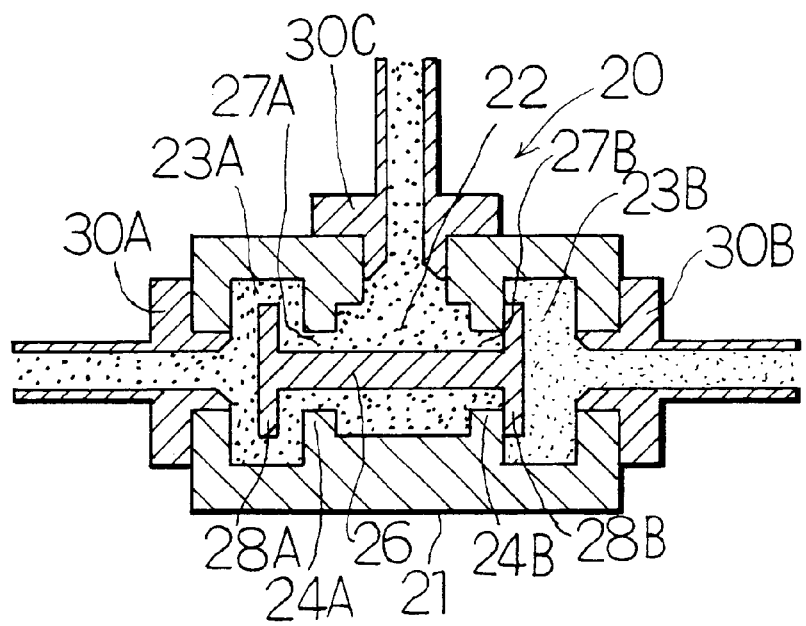
FIG. 3 illustrates an operation of the change-over valve shown in FIG. 2.

If, in the intake step of the first cylinder, the absolute value of the negative pressure in the first intake passage 9A is larger than that of the negative pressure in the second intake passage 9B, then the slide member 26 is displaced by the difference between the pressure in the first pressure detection chamber 23A and the pressure in the second pressure detection chamber 23B on the side of the first pressure detection chamber 23A. At that time, the second valve body 28B engages the partition 24B as shown in FIG. 3 to close the vent hole 27B. Since the vent hole 27A is opened, the negative pressure in the first intake passage 9A is transmitted through the connection pipe 31A, the first pressure detection chamber 23A, the intermediate chamber 22 and the connection pipe 31C to the negative pressure sensor 18 whereby the negative pressure in the intake passage 9A is detected by the negative pressure sensor 18.

Similarly, since, in the intake step of the second cylinder, the slide member 26 is displaced by the difference between the pressure in the first pressure detection chamber 23A and the pressure in the second pressure detection chamber 23B on the side of the second pressure detection chamber 23B, the first valve body 28A engages the partition 24A to close the vent hole 27A. Since the vent hole 27B is opened by this operation, the negative pressure in the second intake passage 9B is transmitted through the connection pipe 31B, the second pressure detection chamber 23B, the intermediate chamber 22 and the connection pipe 31C to the negative pressure sensor 18 whereby the negative pressure in the intake passage 9B is detected by the negative pressure sensor 18.

In this manner, according to the invention, since the intake negative pressures in the intake passages of the two cylinders can be individually detected by the single negative pressure sensor 18, the intake negative pressure of each of the cylinders of the multi-cylinder internal combustion engine can be positively detected.

Figures 5A, 5B:
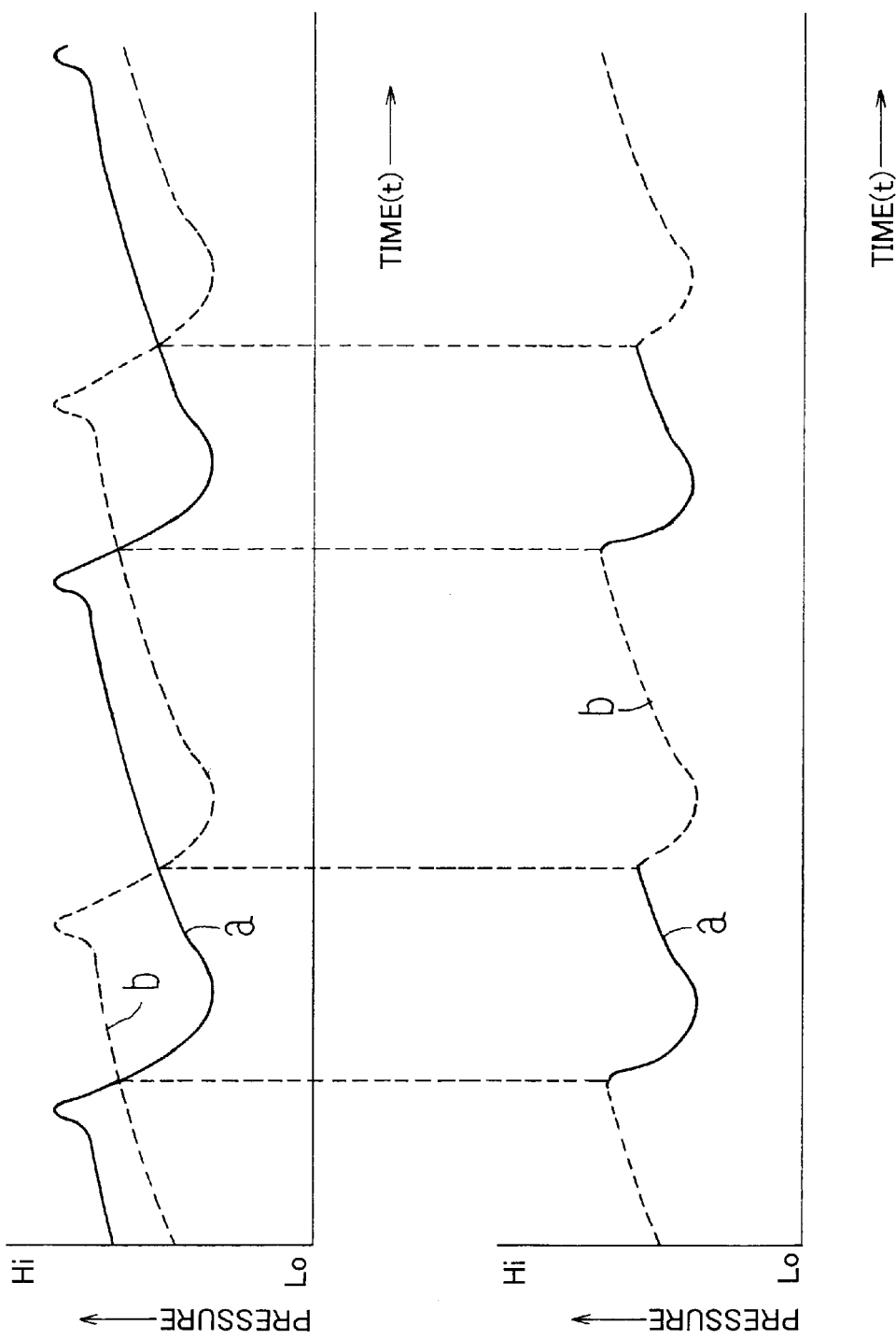
FIGS. 5A and 5B show variation in the intake negative pressure of the two cylinders of the engine shown in FIG. 1 relative to time and variation in the detected output of the intake negative pressure detection apparatus of the invention, respectively.

Supposed that the intake negative pressures in the first and second cylinders are as indicated by curves a and b of FIG. 5A, variation in the intake negative pressure detected by the negative pressure sensor 18 of the intake negative detection apparatus of the invention is as indicated by a curve of FIG. 5B. Thus, it will be noted that the intake negative pressure a and the intake negative pressure b are alternately detected.

Which of the cylinders the intake negative pressure obtained from the negative pressure sensor 18 every moment corresponds to can be decided by judging which step each of the cylinders is in from the rotational angle information of the engine which can be obtained by an output of a pulser such as a signal generator attached to the crankshaft or the cam shaft of the engine to generate a pulse signal at predetermined rotational angle of the engine. The intake negative pressures in the first and second cylinders can be measured by sampling the negative pressure obtained from the negative pressure sensor 18 when it is judged by the rotational angle information obtained from the pulser that the first or second cylinder is in the intake step.

In this manner, according to the invention, since the negative pressures in all the cylinders can be individually detected, variation in the operation of the engine such as variation in the acceleration state, the load state and so on can be detected from the variation in the intake negative pressure detected without any delay which tends to occur in case that the operation state of the engine is detected by the negative pressure in one of the cylinders. Thus, variation in the operation of the engine can be detected without any delay whereby the engine can be properly controlled.

In the illustrated embodiment, the intake negative pressure of the two cylinder internal combustion engine is detected as briefly shown in FIG. 6A.

The invention can be applied not only to the two cylinder internal combustion engine, but also to the three or four cylinder internal combustion engine. In the three or four cylinder internal combustion engine, the intake passages of the three or four cylinders are connected through the change-over valves to the negative pressure sensor in a tournament form whereby the intake negative pressures of all the cylinders can be detected by the single negative pressure sensor.

FIG. 6B shows the intake negative pressure detection apparatus for the three cylinder internal combustion engine. In this embodiment, the first and second change-over valves 20A and 20B constructed as shown in FIG. 2 are prepared. The first and second ports 29A and 29B of the first change-over valve 20A are connected through the connection pipes to the first and second intake passages 9A and 9B of the first and second cylinders, respectively. The first port 29A of the second change-over valve 20B is connected to the third port 29C of the first change-over valve 20A and the second port 29B of the second change-over valve 20B is connected to the third intake passage 9C of the third cylinder of the internal combustion engine. The negative pressure sensor 18 is connected to the third port 29C of the second change-over valve 20B. In this embodiment, the change-over means is formed by the first and second change-over valves 20A and 20B.

FIG. 6C shows the intake negative pressure detection apparatus for the four cylinder internal combustion engine. In this embodiment, the first through third change-over valves 20A through 20C constructed as shown in FIG. 2 are prepared.

The first and second ports 29A and 29B of the first change-over valve 20A are connected to the first and second intake passages 9A and 9B of the first and second cylinders, respectively, and the first and second ports 29A and 29B of the second change-over valve 20B are connected to the third and fourth intake passages 9C and 9D of the third and fourth cylinders, respectively. The first and second ports 29A and 29B of the third change-over valve 20C are connected to the third ports 29C of the first and second change-over valves 20A and 20B, respectively and the third port 29C of the third change-over valve 20C is connected to the negative pressure sensor 18. In this embodiment, the change-over means is formed by the first through third change-over valves 20A through 20C.

Although, in the aforementioned embodiments, the intake negative pressure in all the cylinders are detected by the one negative pressure sensor, in case that pressure loss gets larger due to too many change-over valves used because of more cylinders, there may be provided a plural of negative pressure sensors, each of which detects the intake negative pressure in a plural of cylinders.

For instance, in the four cylinder internal combustion engine, the change-over valve 20C of FIG. 6C may be omitted and the negative pressure sensors may be separately connected to the third ports 29C of the change-over valves 20A and 20B.

In this case, two negative pressure sensors are required, but the number of the negative pressure sensors can be one half in comparison with the prior art in which the separate negative pressure sensors are provided for all the cylinders.

The intake negative pressure for the internal combustion engine having the even number of cylinders other than the four cylinder internal combustion engine can be detected in the same manner as aforementioned.

In case that the multi-cylinder internal combustion engine has the odd number of cylinders, the intake negative pressure in one of the cylinders is detected by the peculiar negative pressure sensor while the intake negative pressure in the remaining even number of cylinders can be detected by the negative pressure sensors, the number of which can be one half of the number of cylinders. For instance, in the embodiment of FIG. 6B, the change-over valve 20B may be omitted and the negative pressure sensor may be connected to the third port 29C of the change-over valve 20A while the other negative pressure sensor may be connected through the connection pipe to the intake passage 9C of the third cylinder.

Figure 7:
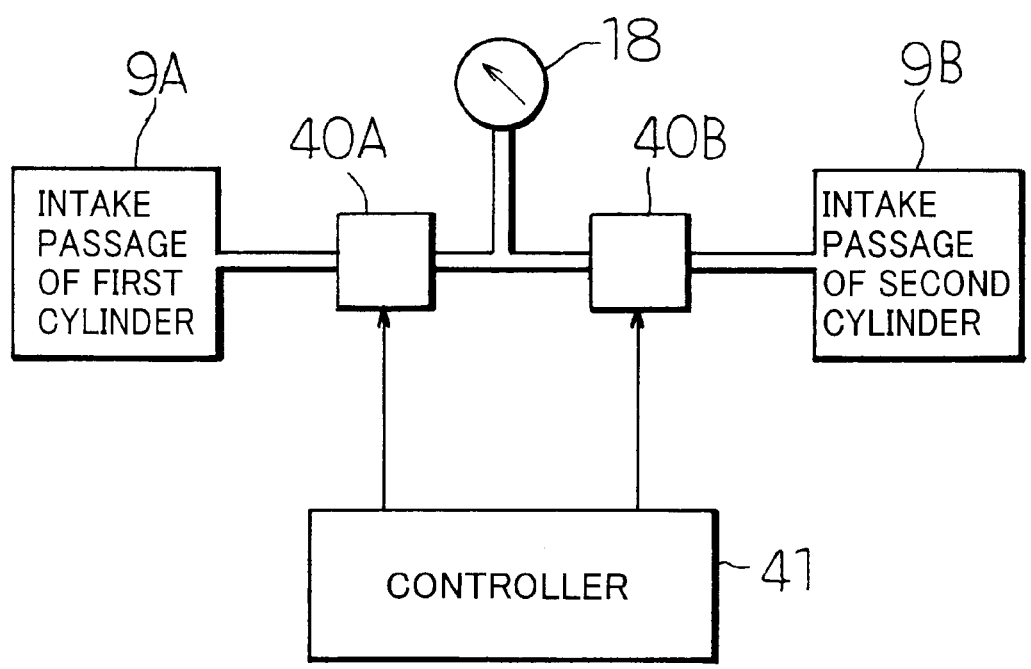
FIG. 7 is a schematic diagram of the apparatus constructed in accordance with another form of the invention.

Although, in the illustrated embodiment, the change-over means to selectively connect the negative pressure sensor to the intake passages in a plural of cylinders is constituted by the mechanical change-over valve 20 or valves, it may be constituted by an electromagnetic valve or valves. In case that the electromagnetic valve or valves are used, as shown in FIG. 7, for instance, to the intake passages 9A and 9B of a plural of cylinders are connected normally closed electromagnetic valves 40A and 40B at one end, respectively, the other ends of which are commonly connected to each other and to the one negative pressure sensor 18. The steps of each of the cylinders are detected in accordance with the rotational angle position information of the engine obtained from the output of the pulser provided on the crankshaft or the camshaft of the engine, the electromagnetic valves 40A and 40B are controlled by a controller 41 in such a manner as an exciting current flows through the electromagnetic valve or valves connected to the intake passages immediately before the intake step of each of the cylinders starts so as to open the electromagnetic valve and stops flowing to close it when the intake step ends. In the embodiment of FIG. 7, the change-over means is constituted by the electromagnetic valves 40A and 40B and the controller 41 to control the valves 40A and 40B.

Although, in the illustrated embodiment, the throttle valve is provided in the intake passage of each cylinder, one throttle valve may be provided commonly for the intake passages of a plural of cylinders, which may be applied to the invention.

According to the invention, since the intake negative pressures in all the cylinders can be individually detected by the negative pressure sensor or sensors, the number of which is fewer than the number of the cylinders, the number of the expensive negative pressure sensor or sensors can be reduced, and therefore the cost for detecting the intake negative pressure can be reduced.

Also, according to the invention, since the intake negative pressure in each of the cylinders can be detected by the negative pressure sensor or sensors, the number of which is fewer than the number of the cylinders, without being influenced by the intake negative pressure in the other cylinder or cylinders, possible variation in the amount of air flowing in each of the cylinders can be detected and therefore the mount of intake air of each cylinder can be properly measured whereby the amount of fuel injection for each cylinder can be positively decided.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An intake negative pressure detection apparatus for detecting a negative pressure in an intake passage provided for each cylinder of a multi-cylinder internal combustion engine, said intake negative pressure detection apparatus comprising a common negative pressure sensor provided for cylinders of said internal combustion engine and connected through change-over means to each intake passage provided for each of said cylinders, and said change-over means being constructed to introduce into said negative pressure sensor said intake passage pressure having the highest absolute value of inner pressure among said inner negative pressures of said intake passages connected to said change-over means.

2. An intake negative pressure detection apparatus for detecting a negative pressure in an intake passage provided for each cylinder of a multi-cylinder internal combustion engine, said intake negative pressure detection apparatus comprising a common negative pressure sensor provided for all cylinders of said internal combustion engine and connected through change-over means to each intake passage provided for each of said cylinders, respectively, said change-over means being constructed to introduce into said negative pressure sensor said intake passage pressure having the highest absolute value of inner pressure among said inner negative pressures of said intake passages connected to said change-over means.

3. An intake negative pressure detection apparatus for a multi-cylinder internal combustion engine as set forth in claim 2, said internal combustion engine having first and second cylinders and first and second intake passages provided for said first and second cylinders and wherein said change-over means comprises a change-over valve including a valve housing having an intermediate chamber provided inside, first and second pressure detection chambers disposed on both sides of and adjacent to said intermediate chamber, first and second penetration holes provided in a first partition between said first pressure detection chamber and said intermediate chamber and a second partition between said second pressure detection chamber and said intermediate chamber, respectively, a slide member extending through said intermediate chamber and said first and second penetration holes and supported on said valve housing in such a manner as it is able to slide, first and second vent holes provided in said first and second partitions so as to communicate said intermediate chamber with said first pressure detection chamber and said second pressure detection chamber, respectively, first and second valve bodies provided on one end of said slide member positioned in said first pressure detection chamber and on the other end of said slide member positioned in said second pressure detection chamber and serving to close said first and second vent holes when said slide member is displaced for predetermined distance on the direction toward said first and second pressure detection chamber, respectively, first and second ports provided in said valve housing so as to communicate said first and second pressure detection chambers with outside and a third port provided in said valve housing so as to communicate said intermediate chamber with outside, said slide member being displaced toward the pressure detection chamber having the lower inner pressure when said first and second pressure detection chambers have the different inner pressures whereby said pressure detection chamber having the lower inner pressure is communicated with said intermediate chamber, said first and second pressure detection chambers being connected through said first and second ports to said first and second intake passages of said cylinders of said internal combustion engine and said intermediate chamber being connected through said third port to said negative pressure sensor.

4. An intake negative pressure detection apparatus for a multi-cylinder internal combustion engine as set forth in claim 2, said internal combustion engine having first through third cylinders and first through third intake passages provided for said first through third cylinders and wherein said change-over means comprises first and second change-over valves and each of said first and second change-over valves including a valve housing having an intermediate chamber provided inside, first and second pressure detection chambers disposed on both sides of and adjacent to said intermediate chamber, first and second penetration holes provided in a first partition between said first pressure detection chamber and said intermediate chamber and a second partition between said second pressure detection chamber and said intermediate chamber, respectively, a slide member extending through said intermediate chamber and said first and second penetration holes and supported on said valve housing in such a manner as it is able to slide, first and second vent holes provided in said first and second partitions so as to communicate said intermediate chamber with said first pressure detection chamber and said second pressure detection chamber, respectively, first and second valve bodies provided on one end of said slide member positioned in said first pressure detection chamber and on the other end of said slide member positioned in said second pressure detection chamber and serving to close said first and second vent holes when said slide member is displaced for predetermined distance on the direction toward said first and second pressure detection chambers, respectively, first and second ports provided in said valve housing so as to communicate said first and second pressure detection chambers with outside and a third port provided in said valve housing so as to communicate said intermediate chamber with outside, said slide member being displaced toward the pressure detection chamber having the lower inner pressure when said first and second pressure detection chambers have the different inner pressures whereby said pressure detection chamber having the lower inner pressure is communicated with said intermediate chamber, said first and second ports of said first change-over valve being connected to said first and second intake passages, respectively, said first port of said second change-over valve being connected to said third port of said first change-over valve, said second port of said second change-over valve being connected to said third intake passage of said internal combustion engine and said third port of said second change-over valve being connected to said negative pressure sensor.

5. An intake negative pressure detection apparatus for a multi-cylinder internal combustion engine as set forth in claim 2, said internal combustion engine having first through fourth cylinders and first through fourth intake passages provided for said first through fourth cylinders and wherein said change-over means comprises first through third change-over valves and each of said first through third change-over valves including a valve housing having an intermediate chamber provided inside, first and second pressure detection chambers disposed on both sides of and adjacent to said intermediate chamber, first and second penetration holes provided in a first partition between said first pressure detection chamber and said intermediate chamber and a second partition between said second pressure detection chamber and said intermediate chamber, respectively, a slide member extending through said intermediate chamber and said first and second penetration holes and supported on said valve housing in such a manner as it is able to slide, first and second vent holes provided in said first and second partitions so as to communicate said intermediate chamber with said first pressure detection chamber and said second pressure detection chamber, respectively, first and second valve bodies provided on one end of said slide member positioned in said first pressure detection chamber and on the other end of said slide member positioned in said second pressure detection chamber and serving to close said first and second vent holes when said slide member is displaced for predetermined distance on the direction toward said first and second pressure detection chambers, respectively, first and second ports provided in said valve housing so as to communicate said first and second pressure detection chambers with outside and a third port provided in said valve housing so as to communicate said intermediate chamber with outside, said slide member being displaced toward the pressure detection chamber having the lower inner pressure when said first and second pressure detection chambers have the different inner pressures whereby said pressure detection chamber having the lower inner pressure is communicated with said intermediate chamber, said first and second ports of said first change-over valve being connected to said first and second intake passages, respectively, said first and second ports of said second change-over valve being connected to said third and fourth intake passages, respectively, said first and second ports of said third change-over valve being connected to said third ports of said first and second change-over valves, respectively, and said third port of said third change-over valve being connected to said negative pressure sensor.

6. An intake negative pressure detection apparatus for detecting a negative pressure in an intake passage of cylinders of a multi-cylinder internal combustion engine, said internal combustion engine having 2n (n is an integer of 2 or more) cylinders and respective intake passages provided for said 2n cylinders, said 2n cylinders being divided into n sets of cylinders, each set of which includes two cylinders having no intake step performed simultaneously and wherein said change-over means comprises n change-over valves, each of which is provided for each set of cylinders and each of said change-over valves including a valve housing having an intermediate chamber provided inside, first and second pressure detection chambers disposed on both sides of and adjacent to said intermediate chamber, first and second penetration holes provided in a first partition between said first pressure detection chamber and said intermediate chamber and a second partition between said second pressure detection chamber and said intermediate chamber, respectively, a slide member extending through said intermediate chamber and said first and second penetration holes and supported on said valve housing in such a manner as it is able to slide, first and second vent holes provided in said first and second partitions so as to communicate said intermediate chamber with said first pressure detection chamber and said second pressure detection chamber, respectively, first and second valve bodies provided on one end of said slide member positioned in said first pressure detection chamber and on the other end of said slide member positioned in said second pressure detection chamber and serving to close said first and second vent holes when said slide member is displaced for predetermined distance on the direction toward said first and second pressure detection chambers, respectively, first and second ports provided in said valve housing so as to communicate said first and second pressure detection chambers with outside and a third port provided in said valve housing so as to communicate said intermediate chamber with outside, said slide member being displaced toward the pressure detection chamber having the lower inner pressure when said first and second pressure detection chambers have the different inner pressures whereby said pressure detection chamber having the lower inner pressure is communicated with said intermediate chamber, said first and second ports of said change-over valve for each set of two cylinders being connected to one and another of said intake passages of each set of two cylinders, respectively, said third ports of said change-over valve being connected to said negative pressure sensor provided for each set of two cylinders.

* * * * *